US006935314B2

(12) United States Patent
Zdroik et al.

(10) Patent No.: US 6,935,314 B2
(45) Date of Patent: Aug. 30, 2005

(54) FUEL RAIL AIR DAMPER

(75) Inventors: Michael J. Zdroik, Metamora, MI (US); Ronald Eugene Baker, Fort Wayne, IN (US); Donna Ann Smith, Elkhart, IN (US)

(73) Assignee: Millennium Industries Corp., Cass City, MI (US)

( * ) Notice: Subject to any disclaimer, the term of this patent is extended or adjusted under 35 U.S.C. 154(b) by 0 days.

(21) Appl. No.: 10/742,538

(22) Filed: Dec. 19, 2003

(65) Prior Publication Data

US 2005/0133008 A1 Jun. 23, 2005

(51) Int. Cl.[7] .......................... F02M 41/00; F16L 55/04

(52) U.S. Cl. ....................... 123/456; 123/516; 123/467; 138/30

(58) Field of Search ................................ 123/456, 467, 123/516; 138/30

(56) References Cited

U.S. PATENT DOCUMENTS

| | | | | |
|---|---|---|---|---|
| 4,570,686 A | | 2/1986 | Devine | |
| 4,601,275 A | | 7/1986 | Weinand | |
| 4,649,884 A | | 3/1987 | Tuckey | |
| 4,930,544 A | | 6/1990 | Ziu | |
| 5,076,242 A | | 12/1991 | Parker | |
| 5,080,069 A | * | 1/1992 | Hudson, Jr. | 123/456 |
| 5,359,976 A | | 11/1994 | Nakashima et al. | |
| 5,471,962 A | * | 12/1995 | Nakashima et al. | 123/456 |
| 5,505,181 A | | 4/1996 | McRae et al. | |
| 5,595,160 A | | 1/1997 | Matsumoto et al. | |
| 5,782,222 A | | 7/1998 | Morris et al. | |
| 5,845,621 A | | 12/1998 | Robinson et al. | |
| 5,894,861 A | | 4/1999 | Lorraine | |
| 5,896,843 A | | 4/1999 | Lorraine | |
| 6,135,092 A | | 10/2000 | Schaenzer et al. | |
| 6,148,798 A | | 11/2000 | Braun et al. | |
| 6,205,979 B1 | | 3/2001 | Sims, Jr. et al. | |
| 6,314,942 B1 | * | 11/2001 | Kilgore et al. | 123/467 |
| 6,390,131 B1 | * | 5/2002 | Kilgore | 138/30 |
| 6,418,909 B2 | * | 7/2002 | Rossi et al. | 123/456 |
| 6,418,910 B1 | | 7/2002 | Nally et al. | |
| 6,431,149 B1 | | 8/2002 | Schwegler et al. | |
| 6,463,911 B1 | | 10/2002 | Treusch et al. | |
| 6,615,801 B1 | * | 9/2003 | Zdroik | 123/467 |
| 2002/0043249 A1 | | 4/2002 | Lee et al. | |
| 2002/0108660 A1 | | 8/2002 | Braum et al. | |
| 2002/0139351 A1 | | 10/2002 | Braum et al. | |
| 2002/0139426 A1 | | 10/2002 | Kippe et al. | |

* cited by examiner

*Primary Examiner*—Thomas Moulis
(74) *Attorney, Agent, or Firm*—Dykema Gossett PLLC

(57) ABSTRACT

A fuel rail is provided for delivering fuel to a plurality of fuel injectors for a reciprocating piston internal combustion engine which in a preferred embodiment includes a sealed housing having an inlet for receiving fuel, the housing having at least first and second outlets for delivering fuel to fuel injectors, a first chamber forming a first control volume with an inlet connected with an interior of the sealed housing, the first chamber forming a vapor space for the sealed housing interior, and a second chamber forming a second control volume with an inlet to the first control volume, the second chamber forming a vapor space for the first control volume.

25 Claims, 4 Drawing Sheets

FUEL RAIL AIR DAMPER

FIELD OF THE INVENTION

The field of the present invention is fuel rails for internal combustion engines and in particular, fuel rails for reciprocating piston, spark-ignited internal combustion engines.

BACKGROUND OF THE INVENTION

In the past three decades, there have been major technological efforts to increase the fuel efficiency of automotive vehicles. One technical trend to improve fuel efficiency has been to reduce the overall weight of the vehicle. A second trend to improve fuel efficiency has been to improve the aerodynamic design of a vehicle to lower its aerodynamic drag. Still another trend is to address the overall fuel efficiency of the engine.

Prior to 1970, the majority of production vehicles with a reciprocating piston gasoline engine had a carburetor fuel supply system in which gasoline is delivered via the engine throttle body and is therefore mixed with the incoming air. Accordingly, the amount of fuel delivered to any one cylinder is a function of the incoming air delivered to a given cylinder. Airflow into a cylinder is effected by many variables including the flow dynamics of the intake manifold and the flow dynamics of the exhaust system.

To increase fuel efficiency and to better control exhaust emissions, many vehicle manufacturers went to port fuel injection systems, where the carburetor was replaced by a fuel injector that injected the fuel into a port which typically served a plurality of cylinders. Although port fuel injection is an improvement over the prior carburetor fuel injection system, it is still desirable to further improve the control of fuel delivered to a given cylinder.

To further enhance fuel delivery, many spark-ignited gasoline engines have gone to a system where a fuel injector is supplied for each individual cylinder. The fuel injectors receive their fuel from a fuel rail, which is typically connected with all or half of the fuel injectors on one bank of an engine. Inline 4, 5 and 6 cylinder engines typically have one bank. V-block type 6, 8, 10 and 12 cylinder engines have two banks.

One critical aspect of a fuel rail application is the delivery of a precise amount of fuel at a precise pressure. In an actual application, the fuel is delivered to the rail from the fuel pump in the vehicle fuel tank. At an engine off condition, the pressure within the fuel rail is typically 45 to 60 psi. When the engine is started, a typical injector firing of 2–50 milligrams per pulse momentarily depletes the fuel locally in the fuel rail. Then the sudden closing of the injector creates a pressure pulse back into the fuel rail. The injectors will typically be open 1.5–20 milliseconds within a period of 10–100 milliseconds.

The opening and closing of the injectors creates pressure pulsations (typically 4–10 psi peak-to-peak) up and down the fuel rail, resulting in an undesirable condition where the pressure locally at a given injector may be higher or lower than the injector is ordinarily calibrated to. If the pressure adjacent to the injector within the fuel rail is outside a given calibrated range, then the fuel delivered upon the next opening of the injector may be higher or lower than that preferred. Pulsations are also undesirable in that they can cause noise generation. Pressure pulsations can be exaggerated in a returnless delivery system where there is a single feed into the fuel rail and the fuel rail has a closed end point.

To reduce undesired pulsations within the fuel rails, many fuel rails are provided with added pressure dampers. Dampers with elastomeric diaphragms can reduce peak-to-peak pulsations to approximately 1–3 psi. However, added pressure dampers are sometimes undesirable in that they add extra expense to the fuel rail and also provide additional leak paths in their connection with the fuel rail or leak paths due to the construction of the damper. This is especially true with new Environmental Protection Agency hydrocarbon permeation standards, which are difficult to satisfy with standard O-ring joints and materials.

It is desirable to provide a fuel rail wherein pressure pulsations are reduced while minimizing the need for dampers.

SUMMARY OF THE INVENTION

To make manifest the above-noted and other desires, a revelation of the present invention is brought forth. In one preferred embodiment, the present invention provides a fuel rail for a plurality of fuel injectors. The fuel rail includes a sealed housing having an inlet for receiving fuel. The housing has at least first and second outlets for delivering fuel to fuel injectors. A first chamber forming a first control volume is provided having an inlet connected with an interior of the housing. The first chamber forms a vapor space for the housing inlet. A second chamber is provided providing a second control volume. The second control volume has an inlet to the first control volume forming a vapor space for the first control volume.

The present invention provides a fuel rail with damping characteristics that minimize or eliminate any requirement for separate pressure dampers to be added to the fuel rail.

Further features and advantages of the present invention will become more apparent to those skilled in the art after a review of the invention as it is shown in the accompanying drawings and detailed description.

DETAILED DESCRIPTION OF THE INVENTION

Figure 1:
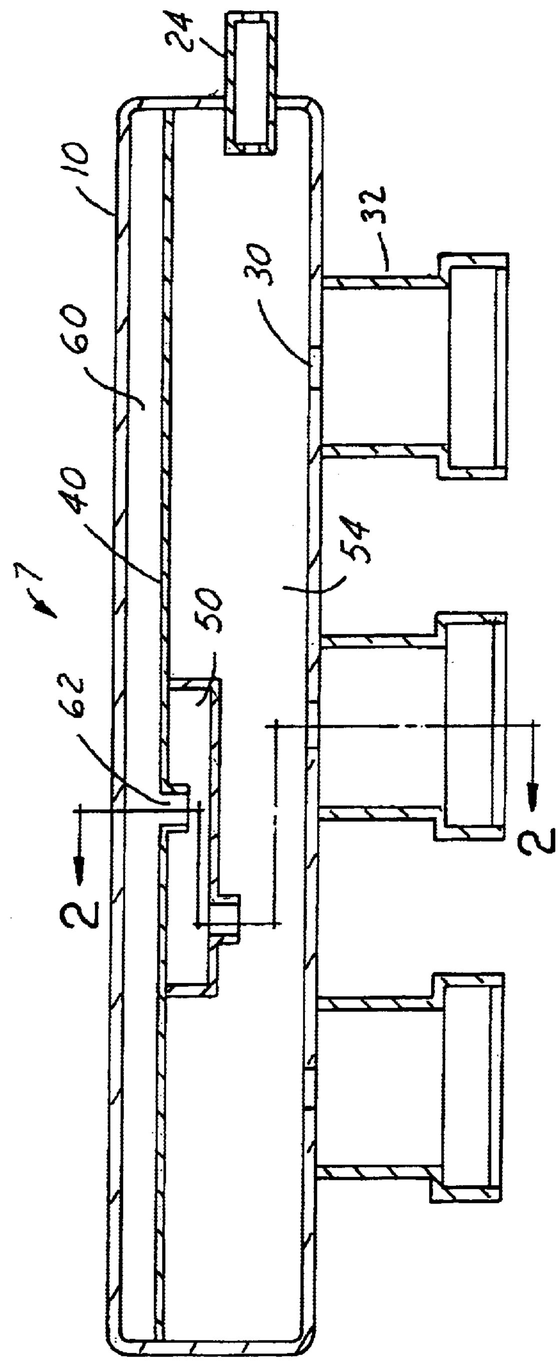
FIG. 1 is a sectional view of a preferred embodiment fuel rail according to the present invention.
Figure 2:
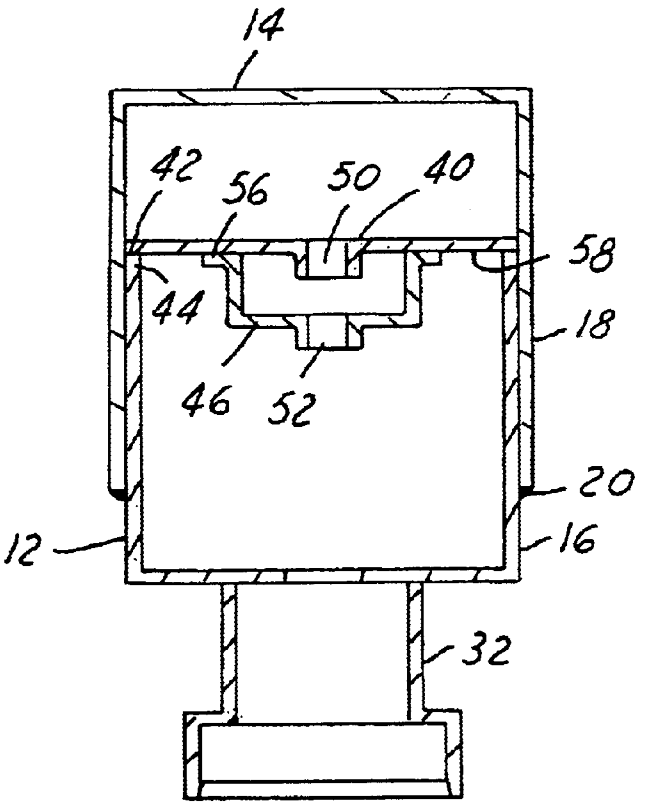
FIG. 2 is a view taken along line 2—2 of FIG. 1.

Referring to FIGS. 1 and 2, the fuel rail 7 of the present invention has a sealed housing 10. The fuel rail 7 provides fuel for a plurality of gasoline (or other spark-ignited fuels) fuel injectors (not shown) in a reciprocating piston spark-ignited internal combustion engine. The housing 10 is formed by male and female shells provided by a lower stamped member 12 and an upper stamped member 14. The members 12, 14 are typically fabricated from low carbon or stainless steel sheet metal having a thickness of 0.3–1.0 mm. The lower stamped member 12 is generally U-shape, having legs 16. The lower stamped member legs 16 are inserted within overlapping legs 18 of the upper stamped member. A brazing 20 seals the lower stamped member and upper stamped member to each other, providing the sealing of the housing 10.

The sealed housing 10 also has an inlet 24 with an orifice approximately 8 mm in diameter. The inlet 24 can be encompassed by a pressure fitting (not shown) which is fluidly connected with a pressurized fuel delivery line.

In the embodiment shown, the fuel rail has three injector outlets 30. Brazed or otherwise fixably sealably attached to the injector outlets 30 are three injector cups 32.

Bifurcating the sealed housing is a baffle plate 40 which can be made of materials similar to that of the sealed housing 10. In the embodiment shown, the baffle plate, has its perimeter 42 sealably engaged with an extreme end 44 of the leg 16. The baffle plate 40 also connects with a generally U-shape channel member 46. The U-shape channel member 46, in cooperation with the baffle plate 40, forms a first control volume or chamber 50. The chamber 50 has an inlet 52 with a filling chamber 54 of the sealed housing 10. The peripheral edges 56 of the channel member 46 are sealably and fixably connected to an underside 58 of the baffle plate 40.

In another embodiment (not shown), the baffle plate can be provided by a U-shape channel member having side legs extending upward parallel adjacent to the side legs 18.

The fuel rail 7 is provided with a second control volume or second chamber 60 which is substantially larger than the first control volume 50. The second control volume 60 provides a secondary vapor trap having an inlet 62 with the first control volume 50.

The inlets 52, 62 in a preferred embodiment will have a length-to-diameter ratio equal or greater than two, and an orifice diameter between 1.0 and 4.0 mm to provide for capillary action between the various control volumes.

In operation, fuel is delivered into the sealed housing 10 through the inlet 24. Air or vapor within the housing is entrapped within the first chamber 50 and the second chamber 60. The air within the chambers 50 and 60 acts as a damper to lower pressure pulsation caused by the rapid opening and closing of fuel injectors (not shown) which are positioned within the injector cups 32. The inlets 52 and 62 ensure that fuel vapor, which condenses upon cooling, will return into the filling chamber 54 when the engine is turned off.

The providing of fuel vapor chambers 50, 60 also helps to ensure that there is air within at least the second chamber 60 which will act as a damper for the pulsating fuel injectors regardless of a potential inclined position of the vehicle or an operational state of the engine that the fuel rail 7 is presenting fuel to.

In another embodiment (not shown) there can be multiple first chambers 50, each one being associated with an inlet to the second chamber 60. The occasional misalignment of the inlets 52 and 62 also aid in the prevention of liquid fuel entering into the second chamber 60.

Figure 3:
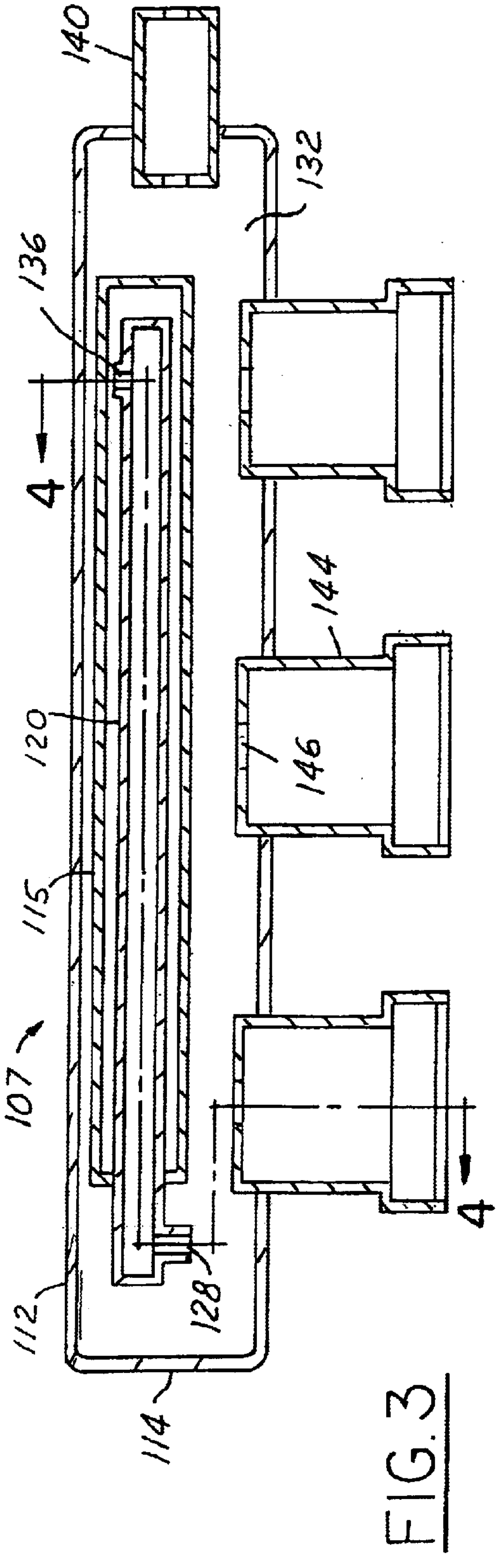
FIG. 3 is a sectional view of an alternate preferred embodiment fuel rail according to the present invention.
Figure 4:
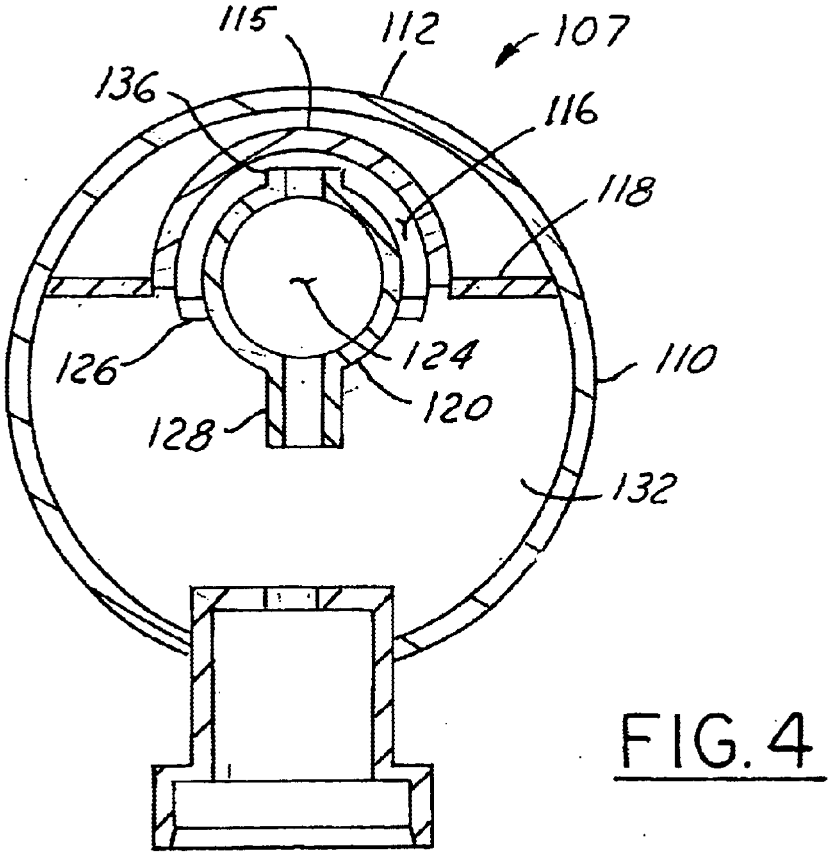
FIG. 4 is a view taken along line 4—4 of FIG. 3.

FIGS. 3 and 4 show an alternate preferred embodiment fuel rail 107. The fuel rail 107 is fabricated from tubular components. The fuel rail 107 has a sealed housing 110 which is fabricated from a tubular member 112. The sealed housing has a first end generally adjacent a fuel inlet 140 and a second opposite end. Tubular member 112 can have a blind blank attached cap 114 or can be optionally sealed by a plug member. Positioned within the sealed housing 110 is a tubular member 115. The tubular member 115 has an interior forming a second vapor chamber 116 which functions similar to that aforedescribed.

The tubular member 115 is supported within the sealed housing 110 by radially extending arms 118. Inserted within the tubular member 115 is a tubular member 120. The tubular member 120 forms a first control volume or vapor chamber 124. Tubular member 120 is substantially supported and positioned within the tubular member 115 by two radially extending arms 126. Tubular member 120 has an inlet opening 128, generally adjacent a second end of the sealed housing 110, with a filling chamber 132 of the fuel rail.

The tubular member 120 also has a flared opening 136. The opening 136 provides an inlet for the second chamber 116 to the first chamber 124. The opening 136 is positioned on an upper portion of the second chamber 116.

The fuel rail 107 also has an inlet 140 and injector cups 144 which are positioned adjacent injector outlets 146. Again, vapor or air entrapped within the second chamber 116 and first chamber 124 act to dampen pulsation caused by the rapid opening and closing of injectors (not shown) placed within the injector cups 144.

Figure 5:
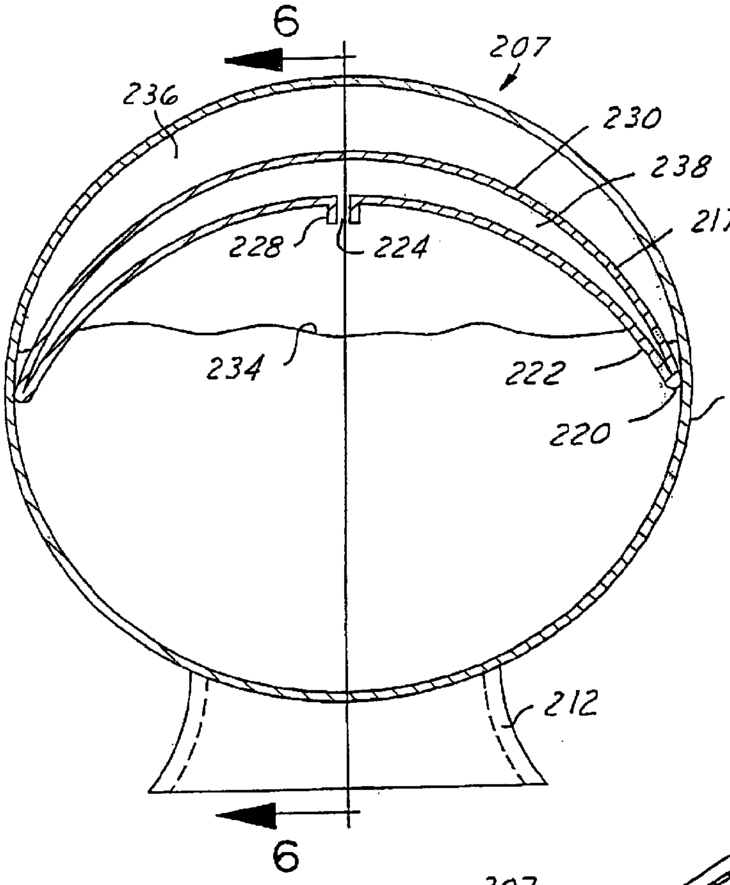
FIG. 5 is a sectional view of an alternate preferred embodiment fuel rail according to the present invention.
Figure 6:
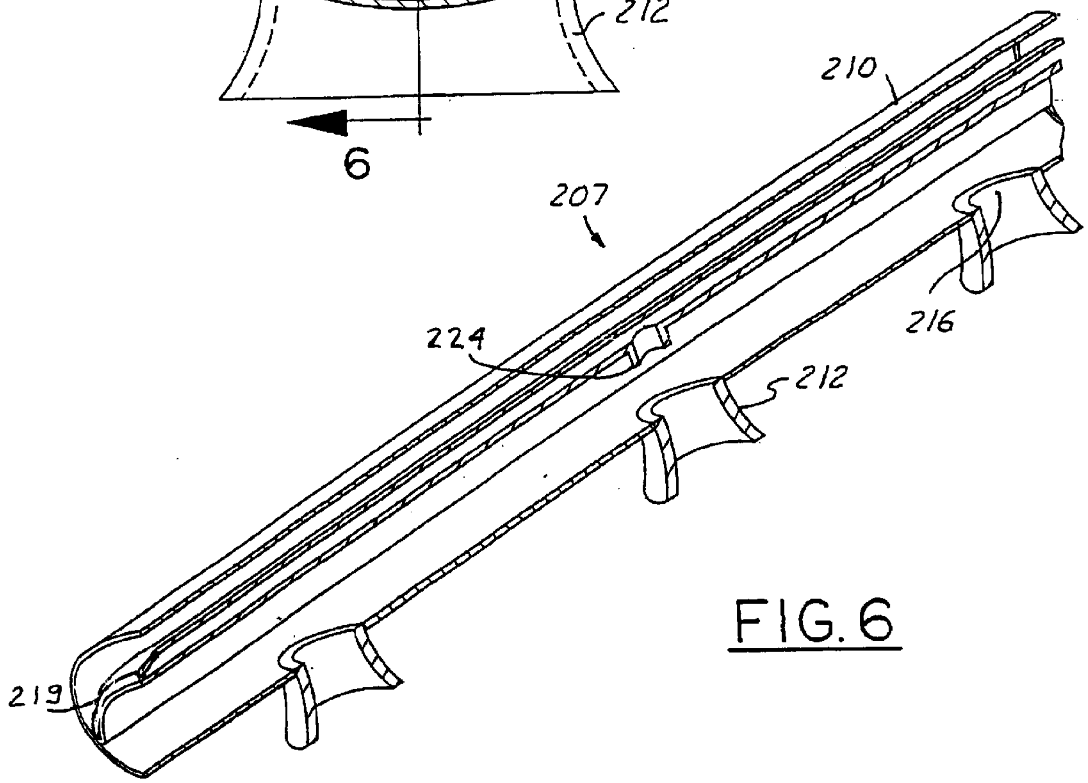
FIG. 6 is a view taken along line 6—6 of FIG. 5.

Referring to FIGS. 5–6, an alternate preferred embodiment fuel rail 207 according to the present invention, is provided. The fuel rail 207 has a sealed housing provided by a tubular member 210. Semi-spherical end caps (not shown) enclose the tubular member 210 at opposite ends. The sealed housing 210 has an inlet (not shown) similar to that of the fuel rails 7 and 107. The fuel rail 207 also has a series of injector outlets 216. The fuel rail 207 has an insertable damper 217. The damper 217 has opposite transverse ends 220 and longitudinal ends 219 (only one shown in FIG. 6) which are sealed.

The damper 217 has a lower arcuate wall 222 that forms a semi-conic pocket with respect to its opposite ends 220. Generally along an apex of the lower wall 222 is a vent 224. Vent 224 has a side wall 228, which aids in the formation of droplets of vaporized fuel within the fuel rail 207. The damper 217 also has an upper arcuate wall 230. Between the upper wall 230 and the lower wall 222, a damping control volume or vapor pocket is formed by the damper. The upper and lower walls will preferably, in their free form, have a formed radius or diameter greater than that of the tubular member 210. Therefore, upon insertion within the tubular member 210, the damper 217 opposite ends will spring outward and generally, by spring force, be self retaining within the housing 210. In most instances, mounting devices and methods such as connectors, fasteners, clips, retainers, adhesive application or a tacking and brazing operation will not be required to retain the damper 217 in position.

In operation, fuel will typically compress the air captured in the semi-elliptical pocket formed by the lower wall and approach a level which is below that of the vent 224. The vent 224 will have a length-to-diameter ratio equal to or greater than two, to promote capillary action. The volume of the air above the fluid level 234, with the addition of the air within the damper 217, will act as a damping force upon the fuel, in response to pulsations caused by the opening of the various fuel injectors. Fuel may leak past the opposite ends 220 and enter into a control volume 236, which is formed between the upper wall 230 and the housing tubular member 210. Air entrapped within this space will further add to the damping capacity of the damper. And, if by chance, control volume 236, is in a solid (full) condition, air will still be entrapped within the control volume 238 formed between the lower and upper walls 222, 230.

In the prior manufacturing process, a fuel rail would typically have the components of a fuel rail housing with first and second end caps. Additionally, adjacent to the injector outlets formed in the rail housing, there were attached injector cups. In the prior fabrication process, the rail housing and the injector cups and one of the end caps were connected and brazed together. The damper was fabricated separately from the housing and its injector cups. The damper was connected with attachment clips. The damper and attachment clips were inserted into the open end of the housing. The attachment clips were used to connect the damper within the housing. The other end cap of the housing was welded to the housing using a laser weld process in order to minimize the conduction of heat to other components. The fuel was then ready for leak tests.

With the fuel rail 207, an insertable damper can be installed within the housing without the use of fasteners or clips or retainers. The injector cups and end caps can be attached to the housing in one brazing operation. The fuel rail is now prepared for final leak tests. The laser welding of one of the end caps can be eliminated.

Figure 8:
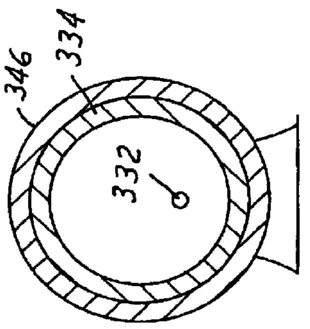
FIG. 8 is a view taken along line 8—8 FIG. 7.
Figure 7:
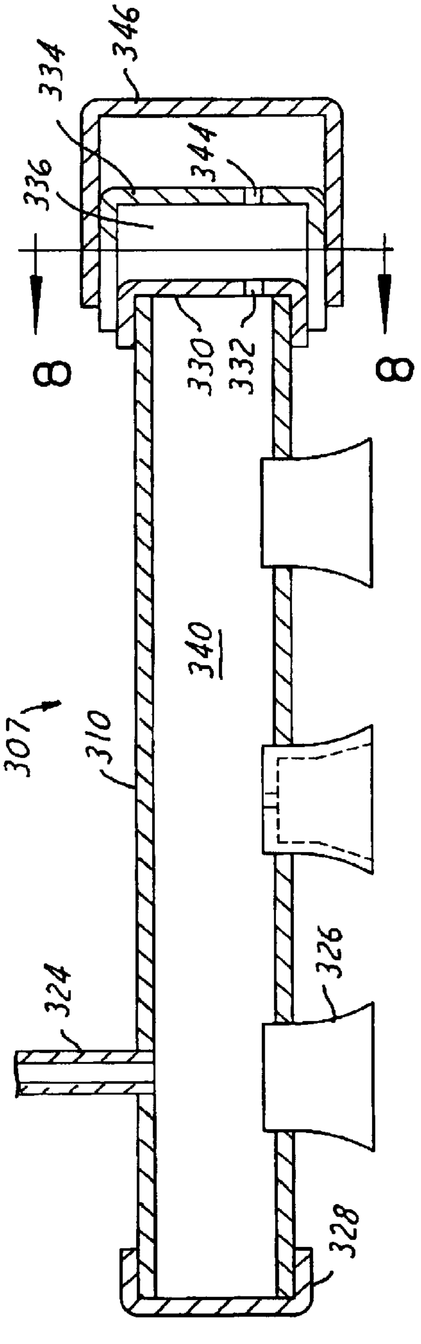
FIG. 7 is a sectional view of yet another alternate preferred embodiment fuel rail according to the present invention.

Referring to FIGS. 7 and 8, an alternate preferred embodiment fuel rail 307 is provided. The fuel rail 307 has a sealed housing which is provided preferably by a cylindrical tubular member 310. The cylindrical member 310 has a fuel inlet 324 and a series of injector outlets having injector cups 326 inserted therein. An extreme end of the tubular member 310 can be sealed by a cap member 328. Typically, cap member 328 will be sealably connected with the tubular member 310 by brazing or other suitable means. An opposite extreme end of the tubular member 310 is sealed by a cap member 330. The tubular member 310 is oriented generally horizontally. The cap 310 together with cap 328 and tubular member 310 form a sealed housing for the fuel rail 307. The cap 330 has an orifice or outlet 332. Adjacent to the extreme end the tubular member 310 is an outer cap 334. The outer cap 334 is sealably connected either with cap 330 or alternatively with the tubular member 310 (in an embodiment not shown) and forms a first control volume adjacent to the interior filling chamber 340 of the fuel rail. The space within the first control volume 336 for the fuel rail forms a vapor space. The cap 334 additionally has an orifice outlet 344. Sealably engaged with the cap 334 is an extreme outer cap 346 which forms a second control volume which acts as secondary vapor space for the interior of fuel rail.

Figure 9:
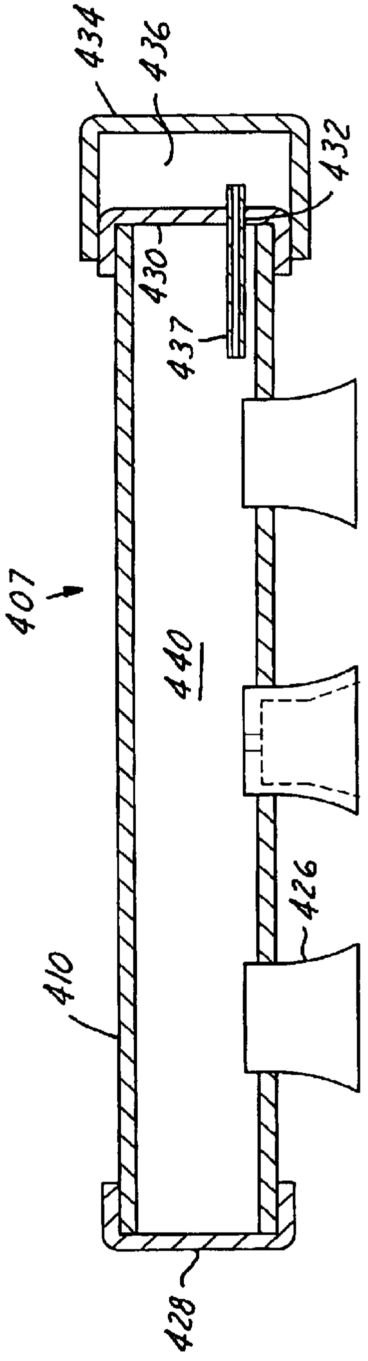
FIG. 9 is a view similar to that of FIG. 7 of yet another alternate preferred embodiment fuel rail according to the present invention.

Referring to FIG. 9 an element fuel embodiment fuel rail 407 is provided which includes a tubular member 410 having an inlet (not shown) sealably capped by an end cap 428 at one extreme end and an end cap 430 on the opposite extreme end. Additionally, the fuel rail 407 has a series of injector outlets having injector cups 426 sealably connected therein. The cap member 434 forms a chamber 436. The cap 430 has an orifice opening 432 which has a capillary tube 437 inserted therein. The capillary tube would typically have a length-to-diameter ratio of ten or greater. The chamber 436 provides a control volume adjacent to an interior 440 of the fuel rail and serves as a vapor chamber. Typically, the orifice outlet 432 will be in the lower half of the cap 430.

The present invention has been shown in various embodiments. It will be apparent to those skilled in the art of changes and modifications which can be made without departing from the spirit or scope of the invention as it is encompassed by the following claims.

What is claimed is:

1. A fuel rail for delivering fuel to a plurality of fuel injectors for a reciprocating piston internal combustion engine comprising:

a sealed housing having an inlet for receiving fuel, said housing having at least first and second outlets for delivering fuel to fuel injectors;

a first chamber forming a first control volume with an inlet connected with an interior of said sealed housing, said first chamber forming a vapor space for said sealed housing interior; and a second chamber forming a second control volume with an inlet to said first control volume, said second chamber forming a vapor space for said first control volume.

2. A fuel rail as described in claim 1, wherein said first and second control volumes are positioned within said sealed housing.

3. A fuel rail as described in claim 1, wherein said second control volume is significantly larger than said first control volume.

4. A fuel rail as described in claim 1, wherein said first chamber is substantially positioned within said second chamber.

5. A fuel rail as described in claim 4, wherein said first chamber is a tubular member insertable within said second chamber.

6. A fuel rail as described in claim 4, wherein said second chamber is positioned within said sealed housing.

7. A fuel rail as described in claim 1, wherein said sealed housing is mainly fabricated by sheet metal stampings.

8. A fuel rail as described in claim 4, wherein said second chamber inlet is generally adjacent a top portion of said second chamber.

9. A fuel rail as described in claim 1, wherein said inlet connected with an interior of said housing and said first control volume has a length-to-diameter ratio generally equal or greater than two-to-one.

10. A fuel rail as described in claim 1, wherein said inlet connected with said first and second control volumes has a length-to-diameter ratio generally equal to or greater than two-to-one.

11. A fuel rail as described in claim 9, wherein said inlet connected with said first and second control volumes has a length-to-diameter ratio generally equal to or greater than two-to-one.

12. A fuel rail for delivering fuel to a plurality of fuel injectors for a reciprocating piston internal combustion engine comprising:

a sealed housing having an inlet for receiving fuel, said housing having at least first and second outlets for delivering fuel to fuel injectors;

a first chamber encompassed within said sealed housing, said first chamber forming a first control volume with an inlet connected with an interior of said sealed housing, said first chamber forming a vapor space for said sealed housing interior; and a second chamber encompassed within said sealed housing, said second chamber forming a second control volume with an inlet to said first control volume, said second control volume being significantly large than said first control volume, said second chamber forming a vapor space for said first control volume.

13. A fuel rail for delivering fuel to a plurality of fuel injectors for a reciprocating piston internal combustion engine comprising:

a sealed housing having a first end inlet for receiving fuel, said housing having at least first and second outlets for delivering fuel to fuel injectors, said sealed housing having a second end generally opposite said first end;

a first chamber encompassed within said sealed housing, said first chamber forming a first control volume with an inlet connected with an interior of said sealed housing, said first chamber forming a vapor space for said sealed housing interior, and said first inlet being generally adjacent one of said ends of said sealed housing; and a second chamber encompassing said first chamber, said second chamber forming a second control volume with an inlet to said first control volume, said second chamber forming a vapor space for said first control volume, and wherein said second inlet being generally adjacent said other one of said ends of said sealed housing.

14. A fuel rail as described in claim 13, wherein said second inlet is connected with an upper portion of said first chamber.

15. A fuel rail for delivering fuel to a plurality of fuel injectors for a reciprocating piston internal combustion engine comprising:

a sealed housing having an inlet for receiving fuel, said housing having at least first and second outlets for delivering fuel to fuel injectors; and a damper insertable within said housing, said damper having opposite transverse ends contacting with said sealed housing with a lower wall forming an arcuate semi-conic pocket with respect to said damper opposite ends, and said damper having an upper arcuate wall forming a damper control volume between said upper and lower walls.

16. A fuel rail as described in claim 15, wherein said damper has a vent in said lower wall.

17. A fuel rail as described in claim 15, wherein said damper is self retaining within said housing.

18. A fuel rail as described in claim 15, wherein said damper forms a vapor space with said sealed housing above said damper upper wall.

19. A fuel rail as described in claim 15, wherein said damper vent has a length-to-diameter ratio generally equal to or greater than two-to-one.

20. A fuel rail for delivering fuel to a plurality of fuel injectors for a reciprocating piston internal combustion engine comprising:

a sealed elongated generally horizontal housing having an inlet for receiving fuel, said housing having at least first and second outlets for delivering fuel to fuel injectors, said sealed housing adjacent an extreme end having an outlet;

a first chamber forming a first control volume adjacent to said housing extreme end, said first chamber forming a vapor space for an interior of said sealed housing.

21. A fuel rail as described in claim 20, wherein there is a plurality of chambers, each of said chambers being connected by an adjacent outlet between said chambers and said chambers forming a plurality of vapor spaces for said housing sealed interior.

22. A fuel rail as described in claim 20, wherein therein is a capillary tube placed within said housing orifice outlet with a length to diameter ratio equal to or greater than 10.

23. A fuel rail as described in claim 20, wherein said sealed housing is formed by a cylindrical tubular member and wherein said first chamber is formed by a cap member.

24. An insertable damper for a fuel rail, said damper comprising a lower wall forming an arcuate semi-conic pocket with respect to the damper transverse opposite ends, said damper having an upper arcuate wall forming a damper control volume between said upper and lower walls and said damper being compliant to be self-retained within a housing of a fuel rail.

25. A method of assembling a fuel rail for a spark ignited engine comprising:

providing a housing having injector outlets and having first and second open ends;

inserting within said housing a self-retaining damper;

providing end caps for both ends of said housing and injector cups for connection to said housing adjacent said injector outlets;

brazing said end caps and injector cups to said housing in a brazing operation; and leak testing said fuel rails.

* * * * *

UNITED STATES PATENT AND TRADEMARK OFFICE

CERTIFICATE OF CORRECTION

PATENT NO. : 6,935,314 B2
DATED : August 30, 2005
INVENTOR(S) : Zdroik et al.

It is certified that error appears in the above-identified patent and that said Letters Patent is hereby corrected as shown below:

<u>Column 4,</u>
Line 40, "a semi-conic" should be -- an arcuate semi-cylindrical --.

<u>Column 7,</u>
Line 28, "semi-conic" should be -- semi-cylindrical --.

<u>Column 8,</u>
Line 24, "semi-conic" should be -- semi-cylindrical --.
Line 40, "rails" should be -- rail --.

Signed and Sealed this

First Day of November, 2005

JON W. DUDAS
*Director of the United States Patent and Trademark Office*